Patented Oct. 8, 1929

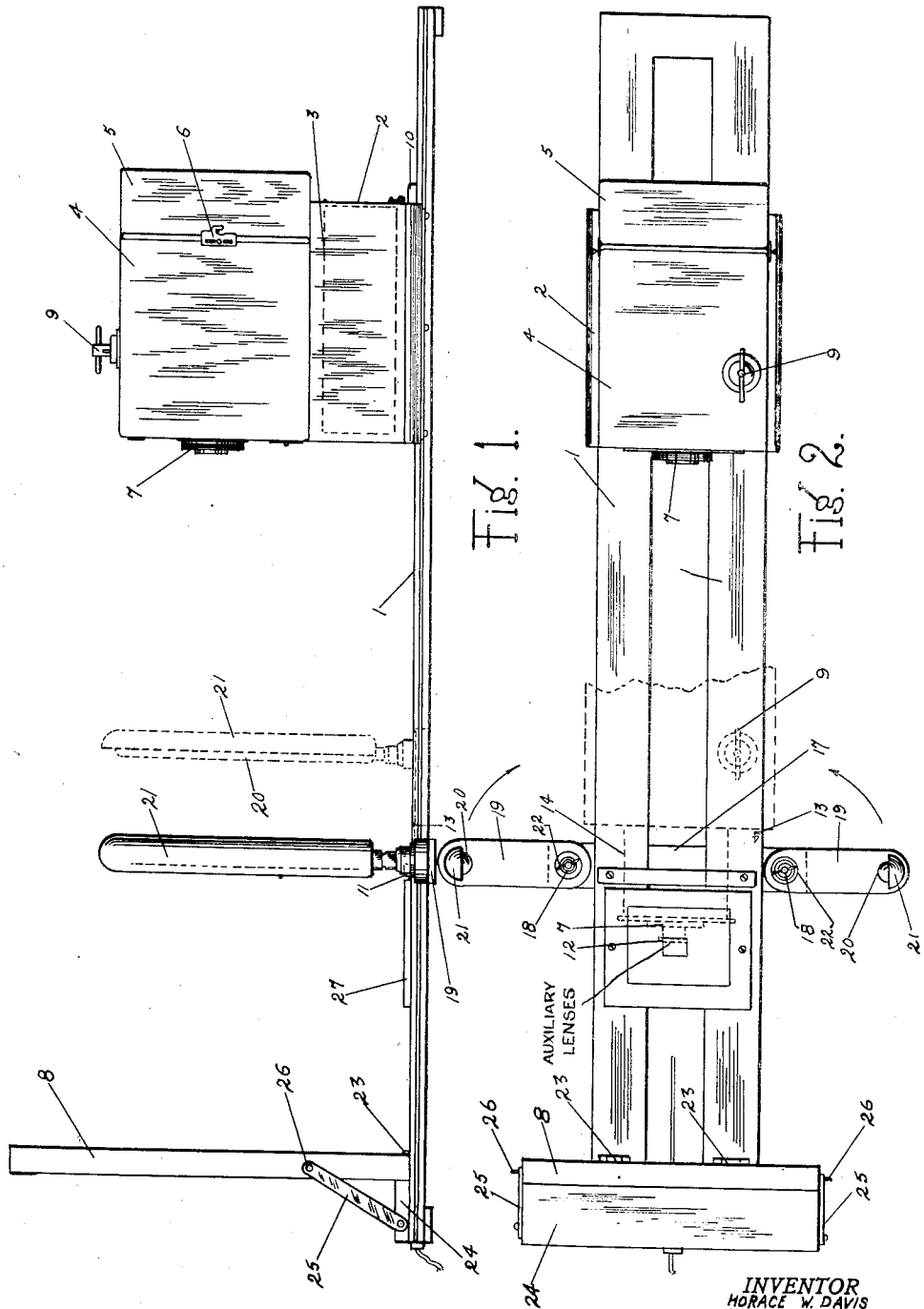

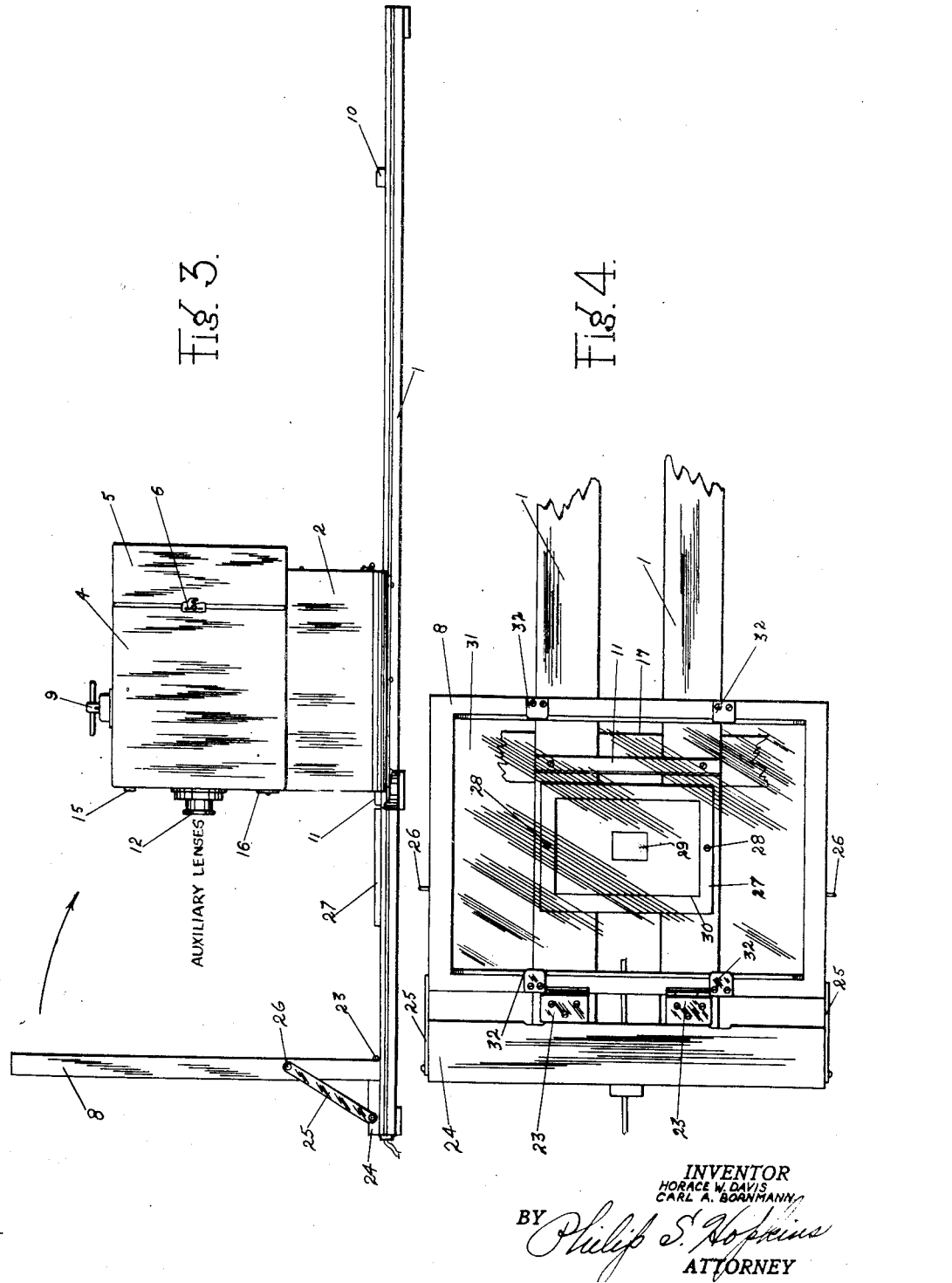

1,730,409

UNITED STATES PATENT OFFICE

HORACE W. DAVIS AND CARL A. BORNMANN, OF BINGHAMTON, NEW YORK, ASSIGNORS, BY MESNE ASSIGNMENTS, TO AGFA ANSCO CORPORATION, OF BINGHAMTON, NEW YORK, A CORPORATION OF NEW YORK

CAMERA

Application filed November 26, 1926. Serial No. 150,810.

Our invention relates generally to cameras and particularly to copying cameras especially adapted for the reproduction of documents, specimens and photographic prints.

Copying cameras now available are limited in their use generally to either the single functions of making a reduction in size from the original, an enlargement, or a reproduction of the same size, requiring 2 or 3 separate cameras to take care of these various operations. Attempts have heretofore been made to combine the enlarging and reducing functions in a single apparatus with automatic focus-changing means operable upon the adjustment of the camera to the various positions. These have not been commercially successful both for mechanical reasons and for the reason that they are expensive, cumbersome and frequently involve the skill of a professional for their operation.

In the ordinary enlarging, reducing or copying camera, not only is more than one apparatus usually necessary, but accurate focusing is required as well as other adjustments with which the average amateur is unfamiliar.

It has been the object of our invention to provide a copying camera which embodies in a single apparatus means for making reduced copies of the original from a given size to the full size of the negative carried in the camera, the reproduction in actual size of the original up to the size of the negative in the camera and the enlargement of a given size original to four times such size, without the necessity of focusing and with a minimum number of adjustments necessary to accomplish these purposes.

This in effect provides a fixed focus copying camera which will reproduce the same size, reduce and enlarge all with a single camera. The uses to which such an apparatus may be put are innumerable, among them notably being the use by philatelists for making copies of rare foreign stamps, plates, pages, etc.

Many novel features enter into the construction of our improved camera, and the objects and advantages thereof will be apparent as the description proceeds, reference being had to the accompanying drawings wherein like reference numerals indicate like parts.

In the drawings:—

Figure 1 is a side elevation illustrating the camera in the position for reducing the size of the original copy as large as the copy holder to the size of the negative in the camera.

Figure 2 is a top plan view of the apparatus illustrating the camera in full lines in the same position as in Figure 1, and in dotted lines in the position for enlarging a given size original copy to four times its size.

Figure 3 is a side elevation of our improved camera showing the camera in position for reproducing an original copy, up to the size of the negative carried by the camera, at actual size.

Figure 4 is a detail top plan view of our improved copy holder in its folded position.

Slideways 1 are provided upon which is slidably mounted a support 2 in the form of a casing constructed to accommodate an inner receptacle 3 (shown in dotted lines in Figure 2) for holding extra negatives or lenses for use in the camera 4 carried by the supporting casing 2. The camera 4 is provided with a removable back 5 which may be of a form and construction to hold film packs, plates or roll film. The construction of the various forms of this back is immaterial and forms no part of this invention. Suffice it to say that the operator may attach whichever form of back he desires to use, to the camera, by means of the fastening device 6.

The camera 4 is provided with the usual lens 7 and shutter, and of course any suitable means for focusing the lens with respect to the copy holder 8 and the negative in the camera. This focusing operation preferably takes place at the factory before the camera is sent out and is focused so that the image will be sharp at the position of the camera shown in Figure 1. No further focusing of this lens is necessary. A winding key 9 is also provided on the camera for winding the film in the event that a "roll film back" is used.

The camera and the supporting member 2 carrying the same are adapted to slide along the slideways 1 toward and from the copy holder 8. There is provided adjacent one end of the slideways 1, a suitable stop member 10 against which the camera engages in its rearmost position, as shown in Figure 1. As before stated, in this position, the camera is so related to the copy holder 8 that the full size of the copy holder 8 and the original copy held thereby will be reduced in size to the full size of the negative, whether plate, film pack or roll film, carried in the camera 4. In other words, in this position of the camera a manuscript or other original of the same size of the copy holder 8 may be reduced and a photographic copy thereof made of the size of the negative in the camera.

If now it is desired to make an exact reproduction in size of the copy material on the copy board, up to the size of the negative of course, the camera is moved along the slideways 1 until it engages against a stop 11 positioned in relatively close proximity to the copy hoder 8. In this position of the camera, an auxiliary lens 12, common in the art, is slipped over the regular lens 7 in order to bring the image on the copy holder into sharp focus with the negative in the camera. No focusing is required, merely the applying of the auxiliary lens 12 on the camera.

If it is desired to make an enlargement four times the size of the original copy carried by the copy holder 8, the camera is moved on the slideways 1 to a point coincident with the index or indicator 13, shown clearly in Figure 2. At such point and for the purpose of enlargement as above stated, the camera is provided with an extension shown at 14 in dotted lines in Figure 2. This extension is provided with the regular lens 7 and the auxiliary lens 12 and is mounted upon the front of the camera by means of the guide 15 and clip or fastening device 16 (see Figure 3). Obviously, this extension 14 is to provide for a longer focus for the purpose of enlargement.

A fixed supporting arm 17 is secured crosswise of the slideways 1, and to this supporting arm are pivoted as at 18, the arms 19 carrying at their outer ends the lamps 20 and reflectors 21. Set screws 22 are provided at the points of pivot for locking the arms 19 in adjusted position. This arrangement permits adjustment of the lamps 20 so as to give a maximum amount of illumination when the camera is in use and to permit the folding of the lamps to a position for facilitating transportation.

The copy holder 8 is hinged at its lower edge at 23 to the slideways 1 and directly back of the copy holder, mounted rigid with the slideways 1, is a laterally extending block 24 against which the copy holder 8 engages when in its upright position. Fixed to this block 24 on either side of the copy holder are arms 25 provided at their outer ends with openings adapted to snap over and engage with pins 26 carried by the sides of the copy holder. Means are thus provided for rigidly maintaining the copy holder in its upright position. It will be understood that by disengaging the arms 25 from the pins 26, the copy holder 8 may be folded down upon the slideways 1, and when in such downwardly folded position, said copy holder overlies a centering platen 27 so mounted on the slideways 1 as to lie exactly in the center of the copy holder 8 when the same is folded downwardly as shown in Figure 4. This centering platen is fixed to the slideways 1 as by screws 28 and is provided preferably with two ruled margins 29 and 30, the former being approximately the size of a postage stamp, and the latter the size of the negative carried by the camera. The copy holder 8 is of course provided with a transparent face 31 so that the centering platen is visible therethrough when the holder 8 is down. This arrangement is very useful in the placing of the matter to be copied in the holder 8, as thereby it may be centered with respect to the copy holder. There is, of course, a removable back for the copy holder 8 (not shown) adapted to engage over the matter to be copied and hold it in position. Such back is of the usual printing frame type, held in position by means of springs engaging under the clips 32 on the edges of the copy holder.

The operation of our improved camera is as follows:—

The operator desiring to make a copy of a postage stamp or similar sized original, first folds the copy holder 8 downwardly to the position shown in Figure 4, and places the matter to be copied on the glass 31, centering the same with respect to the margin 29 on the centering platen 27. The back is then placed on the copy holder and the same pivoted to its upright position and secured as shown clearly in Figures 1, 2 and 3. If it is desired now to make an enlargement of the stamp or other matter to be printed, to four times its actual size, the camera 4 is moved on the slideways 1 to the indicator line 13, and the extension 14 secured on the front of the camera. No focusing is necessary, merely sliding the camera to the predetermined position and affixing the extension 14 with its lenses on the camera. If an exact reproduction in size is desired of the matter to be copied, the camera is slid forward against the stop 11 as shown in Figure 3, and the auxiliary lens 12 placed over the regular lens 7, omitting the extension 14. The camera is thus in position and ready for reproducing the material on the copy holder at actual size on the negative without any focusing whatever.

If the material to be copied is of a size equal to the size of the negative within the camera, it is placed in the copy holder coincident with the margin 30 on the platen 27 and if an exact reproduction as to size is desired, the camera is arranged as shown in Figure 3. If the matter to be copied is larger than the margin 30, up to the full size of the copy holder 8, the camera may be slid back on the slideways 1 against the top 10, and, using the regular lens 7 only, a photographic copy may be made of the original, reduced to the size of the negative in the camera.

It will be seen, therefore, that we have provided in a single camera, a fixed focus, enlarging, reducing and reproducing means, eliminating the necessity for focusing and the ground glass, hoods and other devices which go with focusing, and thus enabling an unskilled operator to make reproductions, enlargements or reduced copies of documents, etc., ranging in size from a postage stamp to the full size of the copy holder, which of course may be of any desired dimensions. The mere shifting of the camera on its slideways and the lens changes are the only operations necessary to bring the camera into focus for the various operations described.

Of course, many changes may be made in details of construction and arrangement of parts without departing from the spirit and scope of our invention. We do not limit ourselves therefore to the exact construction shown, nor to the described use, other than by the appended claims.

We claim:—

1. A copying camera comprising a fixed support, a copy holder, a camera movable on said support, with respect to said copy holder, a plurality of predetermined stop positions for said camera, stop members on said support for the said positions, and separate lenses adapted to be fitted to said camera at certain of said stop positions whereby said camera is properly focused on said copy holder in each of said positions.

2. A copying camera comprising a fixed support, a copy holder, a camera movable on said support to a plurality of definite predetermined stop positions, stop members on said support for said positions, and means for causing said camera to be in focus with said copy holder at each of said stop positions comprising separate lenses for attachment to said camera at such positions.

3. A copying camera comprising a fixed support, a copy holder thereon, a camera slidable on said support to a plurality of predetermined stop positions thereon, stop members on said support for said positions, and detachable lenses for said camera whereby the same is caused to be in focus with said copy holder at each of said stop positions.

HORACE W. DAVIS.
CARL A. BORNMANN.